(12) United States Patent
Lee et al.

(10) Patent No.: US 10,746,245 B2
(45) Date of Patent: Aug. 18, 2020

(54) SHOPPING CART FOOT WHEEL CAPABLE OF WARNING THE ABRASION STATUS OF THE BRAKING BLOCK

(71) Applicant: Jiaxing Xingteng Caster Co., Ltd, Jiaxing (CN)

(72) Inventors: Leon Lee, Jiaxing (CN); Yu Shen, Jiaxing (CN)

(73) Assignee: Jiaxing Xingteng Caster Co,. Ltd. (CN)

( * ) Notice: Subject to any disclaimer, the term of this patent is extended or adjusted under 35 U.S.C. 154(b) by 82 days.

(21) Appl. No.: 16/102,081

(22) Filed: Aug. 13, 2018

(65) Prior Publication Data
US 2019/0048953 A1    Feb. 14, 2019

(30) Foreign Application Priority Data

Aug. 14, 2017 (CN) .......................... 2017 1 0690096

(51) Int. Cl.
| | | |
|---|---|---|
| *F16D 66/02* | (2006.01) | |
| *B62B 5/04* | (2006.01) | |
| *B60B 33/00* | (2006.01) | |
| *B62B 3/14* | (2006.01) | |

(52) U.S. Cl.
CPC ........ *F16D 66/027* (2013.01); *B60B 33/0078* (2013.01); *B60B 33/0089* (2013.01); *B62B 5/0423* (2013.01); *F16D 66/022* (2013.01); *B60B 2200/432* (2013.01); *B62B 3/1492* (2013.01); *B62B 2301/00* (2013.01); *B62B 2301/04* (2013.01); *B62B 2301/254* (2013.01)

(58) Field of Classification Search
CPC . F16D 66/027; F16D 66/022; B60B 33/0078; B60B 33/0089; B60B 2200/432; B62B 2301/04; B62B 2301/254; B62B 2301/00; B62B 5/0423; B62B 3/1492
USPC .................................. 188/1.11 L, 1.12, 11 R
See application file for complete search history.

(56) References Cited

U.S. PATENT DOCUMENTS

| | | | | |
|---|---|---|---|---|
| 3,088,549 A | * | 5/1963 | Borsa ..................... | F16D 66/024 188/1.11 R |
| 3,675,197 A | * | 7/1972 | Bennett ................. | F16D 66/022 340/454 |
| 3,751,757 A | * | 8/1973 | Stosberg ............... | B60B 33/021 16/35 R |
| 3,869,695 A | * | 3/1975 | Kita ....................... | F16D 66/022 340/454 |
| 3,986,164 A | * | 10/1976 | Hirai ..................... | F16D 55/228 340/454 |
| 4,204,190 A | * | 5/1980 | Wiley ................... | F16D 66/022 188/1.11 L |

(Continued)

*Primary Examiner* — Xuan Lan Nguyen

(57) ABSTRACT

A shopping cart foot wheel capable of warning the abrasion status of the braking block comprising an escalator wheel assembly; the escalator wheel assembly comprises an escalator wheel core and escalator wheel discs; the escalator wheel discs are located on the two sides of the escalator wheel core, and are coaxially arranged with the escalator wheel core; the escalator wheel assembly further comprises an escalator wheel support, wherein the escalator wheel support is provided with an escalator wheel axle; locking nuts are simultaneously arranged at the two ends of the escalator wheel axle; the escalator wheel core is connected with the escalator wheel axle in a sleeved mode.

21 Claims, 6 Drawing Sheets

(56) References Cited

U.S. PATENT DOCUMENTS

| | | | | |
|---|---|---|---|---|
| 4,298,857 A | * | 11/1981 | Robins | F16D 66/027 |
| | | | | 188/1.11 L |
| 5,194,844 A | * | 3/1993 | Zelda | B62B 5/0423 |
| | | | | 180/167 |
| 5,559,286 A | * | 9/1996 | White | F16D 66/00 |
| | | | | 340/454 |
| 5,787,547 A | * | 8/1998 | Joseph | B60B 33/00 |
| | | | | 16/35 R |
| 5,875,518 A | * | 3/1999 | Walker | B60B 33/0028 |
| | | | | 15/46 |
| 5,881,846 A | * | 3/1999 | French | B62B 5/0423 |
| | | | | 188/1.12 |
| 2005/0212357 A1 | * | 9/2005 | Adams | B60T 17/18 |
| | | | | 303/122.03 |

* cited by examiner

SHOPPING CART FOOT WHEEL CAPABLE OF WARNING THE ABRASION STATUS OF THE BRAKING BLOCK

TECHNICAL FIELD OF THE INVENTION

The present invention relates to the technical field of foot wheels, and more particularly, to a shopping cart foot wheel capable of warning the abrasion status of the braking block.

BACKGROUND OF THE INVENTION

Due to reasons such as use intensity and operating environment, foot wheels of traditional shopping carts are easily worn during use. Thus, manual checking must be regularly performed for maintaining the wheels.

However, the manual checking is not efficient, and the checking process is laborious, sharply increasing maintenance personnels' efforts. Moreover, the maintenance task is repetitive and tedious, resulting in error rate and false checking. Under such circumstances, personal injury and property loss cannot be avoided.

Thus, it's urgent for those skilled in this field to develop a novel shopping cart foot wheel capable of warning a user to replace the escalator wheel in time before approaching its functional-life limit, thereby effectively ensuring the user's safety.

SUMMARY OF THE INVENTION

The purpose of the present invention is to solve the shortcomings in the prior art by providing a shopping cart foot wheel capable of warning the abrasion status of the braking block.

To achieve the above purpose, the present invention adopts the following technical solution:

A shopping cart foot wheel capable of warning the abrasion status of the braking block comprising an escalator wheel assembly; the escalator wheel assembly comprises an escalator wheel core and escalator wheel discs; the escalator wheel discs are located on the two sides of the escalator wheel core, and are coaxially arranged with the escalator wheel core; the escalator wheel assembly further comprises an escalator wheel support, wherein the escalator wheel support is provided with an escalator wheel axle; locking nuts are simultaneously arranged at the two ends of the escalator wheel axle; the escalator wheel core is connected with the escalator wheel axle in a sleeved mode; the escalator wheel assembly further comprises a first wheel cover and a second wheel cover; the first wheel cover and the second wheel cover are either integrally molded or detachably connected to form a semi-closed accommodating cavity having a downward opening; the escalator wheel core is arranged in the semi-closed accommodating cavity;

The shopping cart foot wheel capable of warning the abrasion status of the braking block of the present invention further comprises a braking block and a broken circuit flash light assembly; the braking block is fixedly arranged on the outer surface of the escalator wheel core, and the bottom of the braking block is in contact with the ground; a pre-buried wire is pre-buried in the bottom of the braking block; the broken circuit flash light assembly is provided with a micro-processing controller; the two ends of the pre-buried wire are simultaneously electrically connected with the input end of the micro-processing controller; the broken circuit flash light assembly is provided with at least one indicator light, which is electrically connected with and controlled by the micro-processing controller.

In another preferred embodiment, two pre-buried wire holes are formed in the bottom of the braking block. The pre-buried wire is pre-buried in the braking block through the pre-buried wire holes.

In another preferred embodiment, the distance between the pre-buried wire holes and the outer surface of the braking block is 2.8 mm.

In another preferred embodiment, a heat shrinkable sleeve is sleeved on the exterior of the broken circuit flash light assembly, and the broken circuit flash light assembly is attached to the outer surface of the escalator wheel core through a hot-melt adhesive.

In another preferred embodiment, the outer diameter of the escalator wheel core is slightly greater than that of the escalator wheel disc.

In another preferred embodiment, the escalator wheel disc is made from PU and PP materials, and is formed via one-step injection molding method.

In another preferred embodiment, the braking block is made from PU material, and is formed via one-step injection molding method.

In another preferred embodiment, the pre-buried wire is made from copper.

In another preferred embodiment, the indicator light comprises but not limited to a red LED light and a yellow LED light.

In another preferred embodiment, the escalator wheel support is further provided with a PP anti-collision ring, a PVC dustproof ring and a metal gasket. The PP anti-collision ring is externally connected with the top side wall of the escalator wheel support, and the PVC dustproof ring is arranged on the top wall of the escalator wheel support. The metal gasket is embedded in the top of the escalator wheel support.

Compared with the prior art, the present invention has the following advantages:

The breakage of the pre-buried wire is prior to the end of the functional life of the escalator wheel. Once the pre-buried wire is broken, the indicator light starts to flash. Thus, a user can be warned to replace the worn escalator wheel in time, thereby ensuring the user's safety.

BRIEF DESCRIPTION OF THE DRAWINGS

To clearly expound the technical solution of the present invention, the drawings and embodiments are hereinafter combined to illustrate the present invention. Obviously, the drawings are merely some embodiments of the present invention and those skilled in the art can associate themselves with other drawings without paying creative labor.

MARKING INSTRUCTIONS OF THE DRAWINGS

100—Escalator Wheel Assembly, 110—Escalator Wheel Disc, 120—Escalator Wheel Core, 130—Escalator Wheel Support, 131—PP Anti-collision Ring, 132—PVC Dustproof Ring, 133—Metal Gasket. 135—Escalator Wheel Axle, 136—Locking Nut 140—The First Wheel Cover, 150—The Second Wheel Cover, 200—Braking Block, 210—Pre-buried Wire Hole, 300—Broken Circuit Flash Light Assembly, 310—Pre-buried Wire

DETAILED DESCRIPTION OF THE INVENTION

Drawings and detailed embodiments are combined hereinafter to elaborate the technical principles of the present invention.

Figure 1:
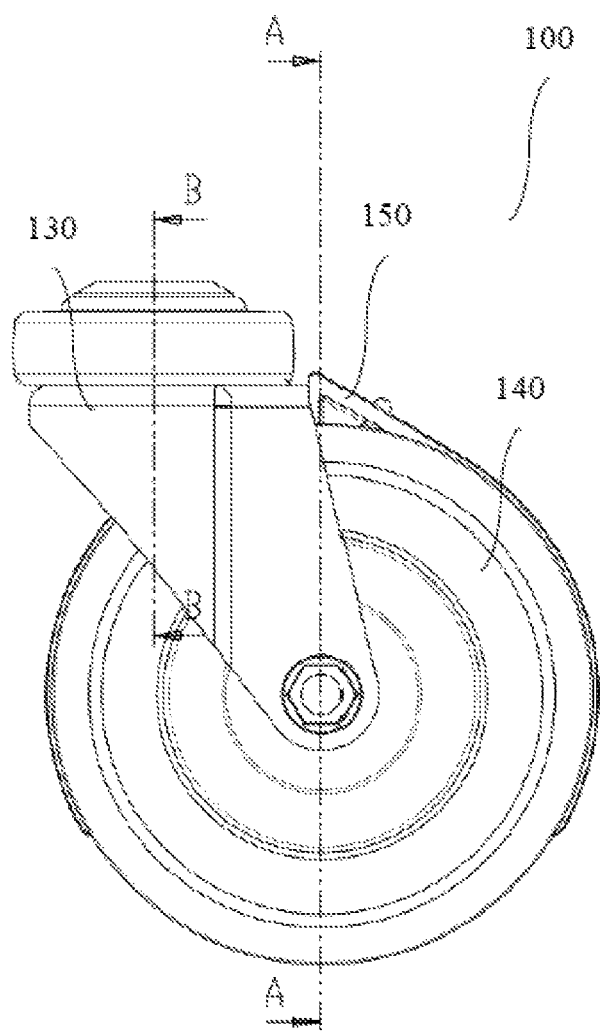
FIG. 1 is a front view of a preferred embodiment of the present invention.
Figure 4:
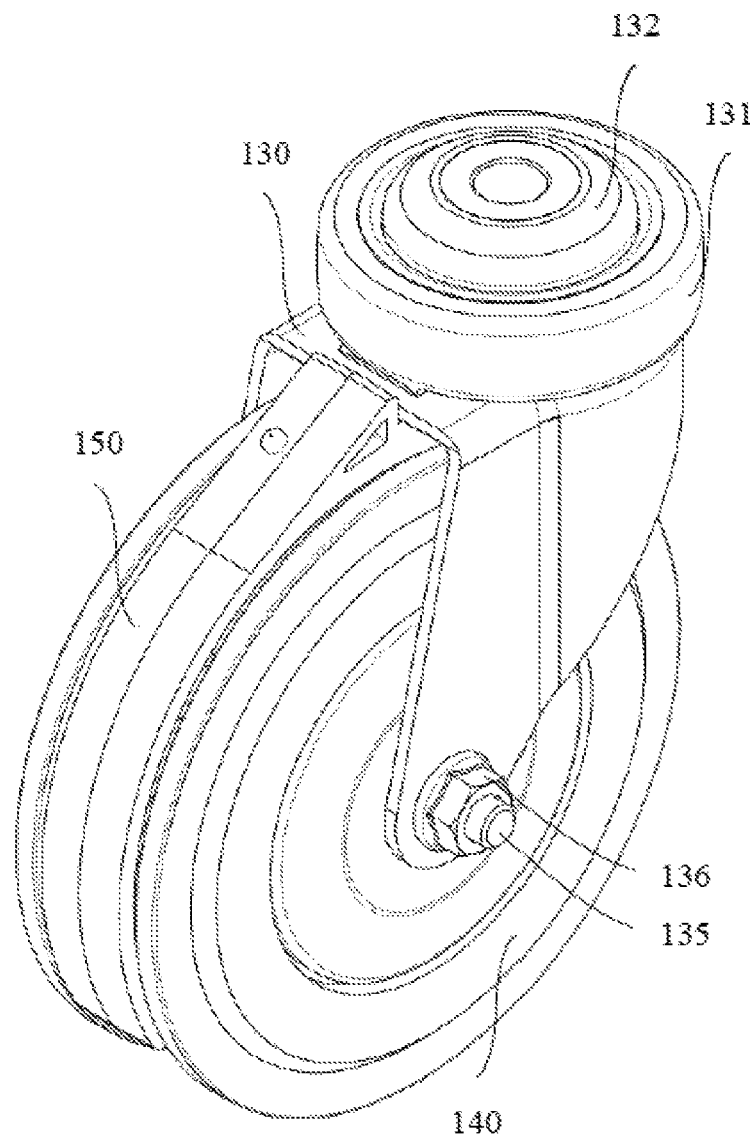
FIG. 4 is a three-dimensional structure diagram of a preferred embodiment of the present invention.

The present invention discloses a shopping cart foot wheel capable of warning the abrasion status of the braking block. The overall structure of the shopping cart foot wheel is shown in FIGS. 1 and 4. Preferably, the shopping cart foot wheel capable of warning the abrasion status of the braking block comprises an escalator wheel assembly 100. The escalator wheel assembly 100 comprises an escalator wheel core 120 and escalator wheel discs 110. The escalator wheel discs are located on the two sides of the escalator wheel core 120, and are coaxially arranged with the escalator wheel core 120. The escalator wheel assembly 100 further comprises an escalator wheel support 130, wherein the escalator wheel support 130 is provided with an escalator wheel axle 135. Locking nuts 136 are simultaneously arranged at the two ends of the escalator wheel axle 135. The escalator wheel core 120 is connected with the escalator wheel axle 135 in a sleeved mode. In this way, the escalator wheel core 120 can rotate around the escalator wheel axle 135 after being propelled by an external force.

In another preferred embodiment, the escalator wheel assembly 100 further comprises a first wheel cover 140 and a second wheel cover 150. The first wheel cover 140 and the second wheel cover 150 are either integrally molded or detachably connected to form a semi-closed accommodating cavity having a downward opening. The escalator wheel core 120 is arranged in the semi-closed accommodating cavity.

Figure 5:
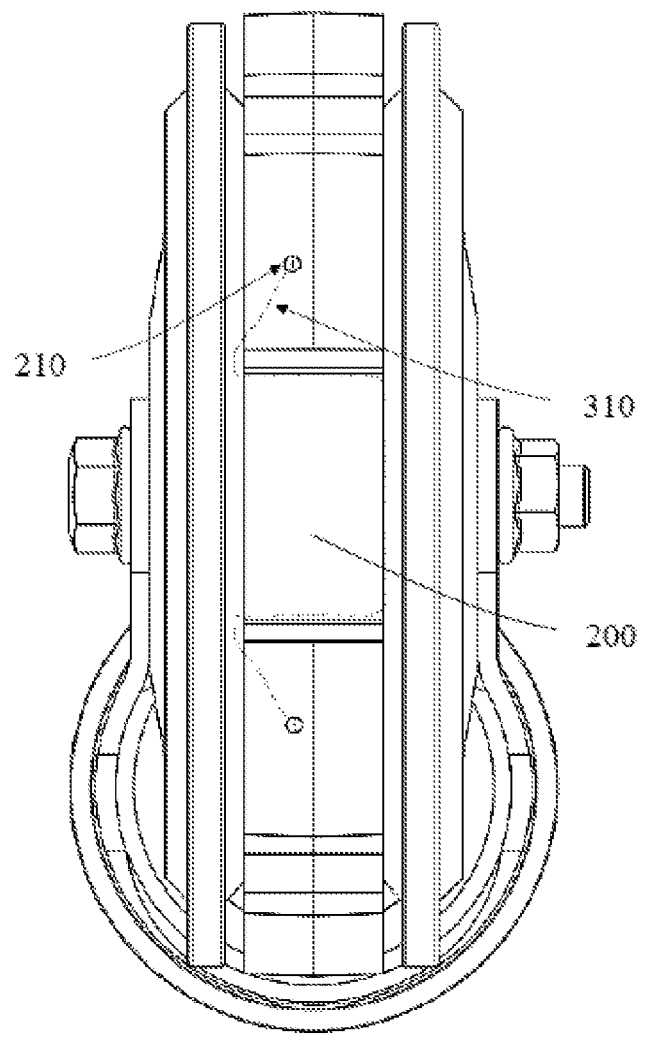
FIG. 5 is a bottom view of a preferred embodiment of the present invention.
Figure 6:
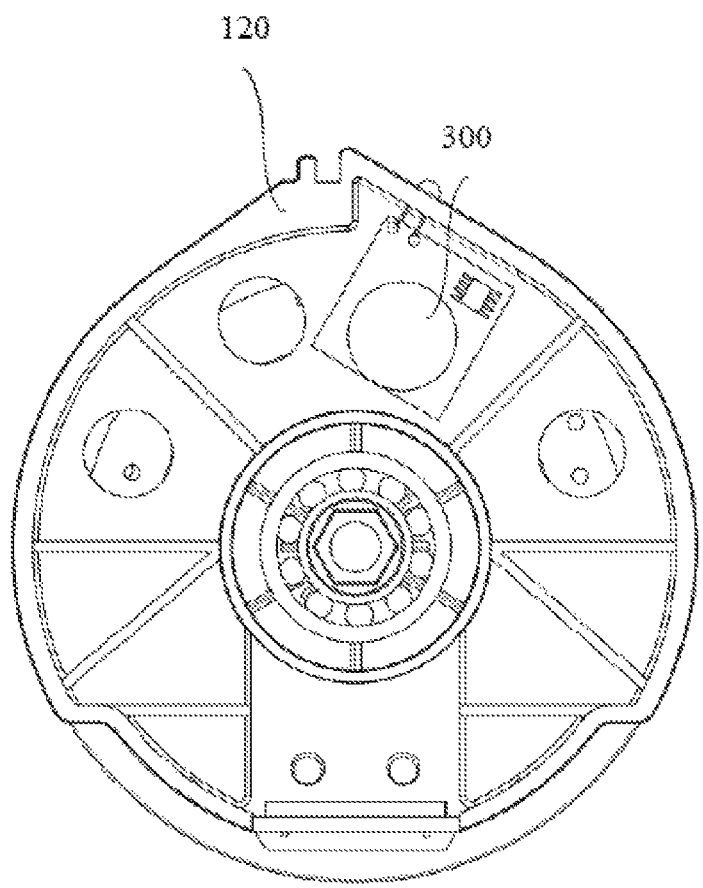
FIG. 6 is a partial structure diagram of a preferred embodiment of the present invention.

FIG. 5 is a bottom view of the shopping cart foot wheel of the present invention, and FIG. 6 shows a partial structure of the shopping cart foot wheel of the present invention. Preferably, the shopping cart foot wheel capable of warning the abrasion status of the braking block of the present invention further comprises a braking block 200 and a broken circuit flash light assembly 300. The braking block 200 is fixedly arranged on the outer surface of the escalator wheel core 120, and the bottom of the braking block 200 is in contact with the ground. A pre-buried wire 310 is pre-buried in the bottom of the braking block 200. The broken circuit flash light assembly 300 is provided with a micro-processing controller (not shown). The two ends of the pre-buried wire 310 are simultaneously electrically connected with the input end of the micro-processing controller (e.g., the IO port of a single-chip microcomputer).

In another preferred embodiment, the broken circuit flash light assembly 300 is provided with an indicator light (not shown), which is electrically connected with and controlled by the micro-processing controller. The aforesaid indicator light comprises but not limited to a red LED light and a yellow LED light.

Figure 2:
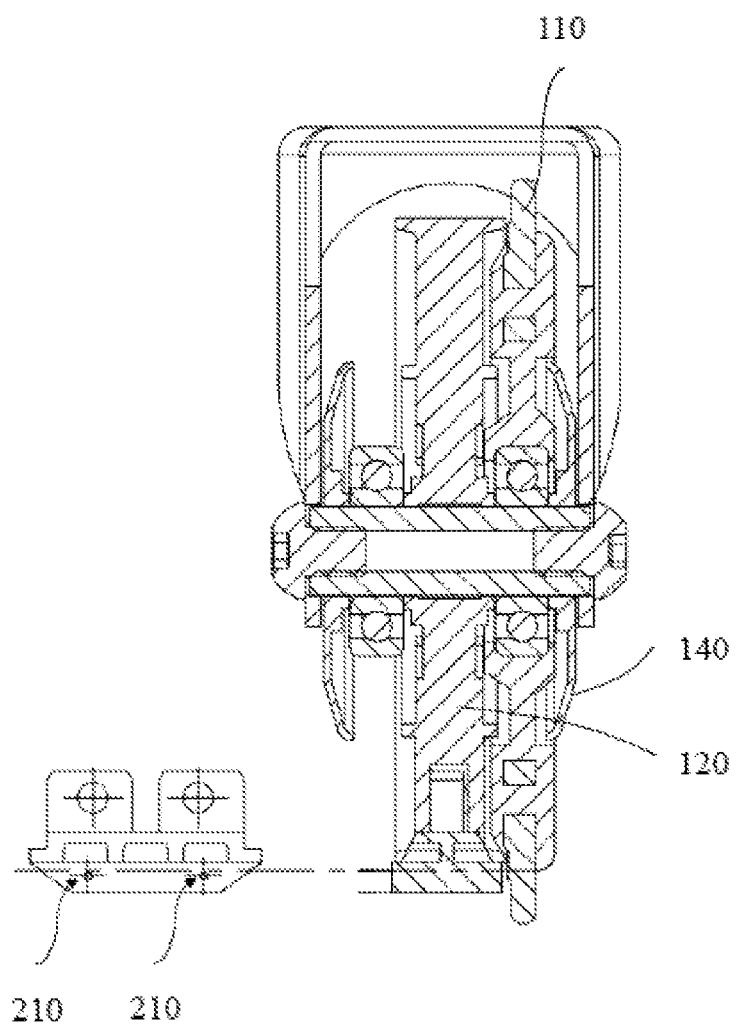
FIG. 2 is sectional views along the direction A-A in FIG. 1.
Figure 3:
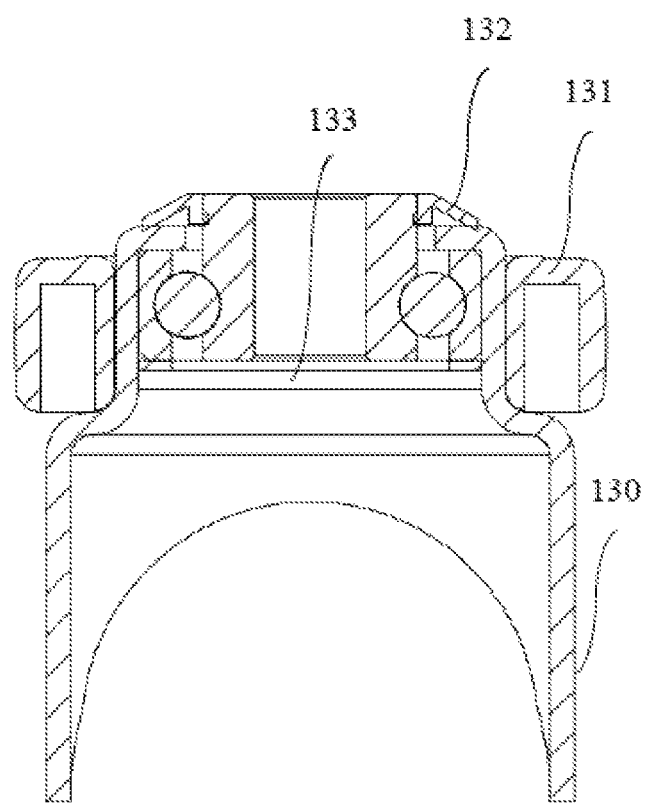
FIG. 3 is a sectional view along the direction B-B in FIG. 1.

As shown in FIGS. 2 and 3, it is preferred that two pre-buried wire holes 210 are formed in the bottom of the braking block 200. The pre-buried wire 310 is pre-buried in the braking block 200 through the pre-buried wire holes 210.

In another preferred embodiment, the distance between the pre-buried wire holes 210 and the outer surface of the braking block 200 is 2.8 mm.

In another preferred embodiment, the broken circuit flash light assembly 300 further comprises a battery (not shown). The micro-processing controller judges whether the pre-buried wire 310 is broken or not through detecting the variation of electrical level of the input end of the micro-processing controller, thereby warning a user to replace the escalator wheel in time through sound-light alarm. When the braking block 200 is worn to a certain degree, the pre-buried wire 310 is broken. At the moment, the electrical level of the input end of the micro-processing controller varies along the variation of the resistance value of the pre-buried wire 310. After the variation of the electrical level is detected by the micro-processing controller, an indicator light (e.g., a red LED light) is correspondingly turned on to warn a user that the functional life of the braking block 200 approaches its limit. When the pre-buried wire 310 has not been broken, the static current of the pre-buried wire 310 is about 2 micro-ampere. The aforesaid battery can ensure that the indicator light flashes for more than three months after three years of normal use of the escalator wheel assembly.

In another preferred embodiment, a heat shrinkable sleeve is sleeved on the exterior of the broken circuit flash light assembly 300, and the broken circuit flash light assembly 300 is attached to the outer surface of the escalator wheel core 120 through a hot-melt adhesive.

In another preferred embodiment, the outer diameter of the escalator wheel core 120 is slightly greater than that of the escalator wheel disc 110. According to this design, the escalator wheel core 120 can be effectively protected from being damaged when the escalator wheel is impacted by an external force.

In another preferred embodiment, the escalator wheel disc 110 is made from PU and PP materials, and is formed via one-step injection molding method. Thus, the wear resistance of the escalator wheel disc 110 can be greatly enhanced.

In another preferred embodiment, the braking block 200 is made from PU material, and is formed via one-step injection molding method.

In another preferred embodiment, the pre-buried wire 310 is made from copper.

In another preferred embodiment, the escalator wheel support 130 is further provided with a PP anti-collision ring 131, a PVC dustproof ring 132 and a metal gasket 133. The PP anti-collision ring 131 is externally connected with the top side wall of the escalator wheel support 130, and the PVC dustproof ring 132 is arranged on the top wall of the escalator wheel support 130. The metal gasket 133 is embedded in the top of the escalator wheel support 130 for supporting a bearing.

When a shopping cart is wheeled for 8 hours per day by about 5-8 users, and enters and exits the escalator for 10 times, tests show that the optimal functional life of the shopping cart escalator wheel is two years. The length of the escalator is about 15-20 meters, and the shopping cart brakes for the whole length of the escalator. However, the actual abrasion of the braking block occurs when the shopping cart enters and exits the escalator. The actual abrasion distance of each shopping cart entering and exiting the escalator is about 1 meter.

Therefore, during the optimal functional life of an escalator wheel, its actual abrasion distance can be calculated by the following:

1 (meter)*10 (times/day)*365 (days/year)*2 (years)
=7300 (meters)

In order to achieve a precise test result, laboratory equipment is used for simulating the grooves on the escalator, and the load of every two braking blocks is 30 kgs. After the escalator wheel is pulled back and forth for 3000 times, and each time is 0.5 meter, the abrasion depth of the braking block is less than 1 mm. When the pre-buried wire that is buried in a depth of 2.8 mm is broken, the actual use of the escalator wheel has exceeded two years. Once the pre-buried wire is broken, the functional life of the escalator wheel is about 4-6 months. At this moment, the indicator light starts to flash. Thus, a user can be warned to replace the worn escalator wheel in time, thereby ensuring the user's safety.

The description of above embodiments allows those skilled in the art to realize or use the present invention. Without departing from the spirit and essence of the present invention, those skilled in the art can combine, change or modify correspondingly according to the present invention. Therefore, the protective range of the present invention should not be limited to the embodiments above but conform to the widest protective range which is consistent with the principles and innovative characteristics of the present invention. Although some special terms are used in the description of the present invention, the scope of the invention should not necessarily be limited by this description. The scope of the present invention is defined by the claims.

The invention claimed is:

1. A shopping cart foot wheel capable of warning the abrasion status of the braking block, comprising:
    an escalator wheel assembly,
    a braking block, and
    a broken circuit flash light assembly, wherein the escalator wheel assembly comprises an escalator wheel core and escalator wheel discs, wherein the escalator wheel discs are located on the two sides of the escalator wheel core, and are coaxially arranged with the escalator wheel core, wherein the escalator wheel assembly further comprises an escalator wheel support,
    wherein the escalator wheel support is provided with an escalator wheel axle, wherein locking nuts are simultaneously arranged at the two ends of the escalator wheel axle, wherein the escalator wheel core is connected with the escalator wheel axle in a sleeved mode, wherein the escalator wheel assembly further comprises a first wheel cover and a second wheel cover,
    wherein the first wheel cover and the second wheel cover are either integrally molded or detachably connected to form a semi-closed accommodating cavity having a downward opening, wherein the escalator wheel core is arranged in the semi-closed accommodating cavity, wherein the braking block is fixedly arranged on the outer surface of the escalator wheel core, and the bottom of the braking block is in contact with the ground, wherein a pre-buried wire is pre-buried in the bottom of the braking block, wherein the broken circuit flash light assembly is provided with a micro-processing controller, wherein the two ends of the pre-buried wire are simultaneously electrically connected with the input end of the micro-processing controller,
    wherein the broken circuit flash light assembly is provided with at least one indicator light, which is electrically connected with and controlled by the micro-processing controller, wherein a heat shrinkable sleeve is sleeved on the exterior of the broken circuit flash light assembly, and the broken circuit flash light assembly is attached to the outer surface of the escalator wheel core through a hot-melt adhesive.

2. The shopping cart foot wheel capable of warning the abrasion status of the braking block of claim 1, wherein two pre-buried wire holes are formed in the bottom of the braking block, wherein the pre-buried wire is pre-buried in the braking block through the pre-buried wire holes.

3. The shopping cart foot wheel capable of warning the abrasion status of the braking block of claim 2, wherein the distance between the pre-buried wire holes and the outer surface of the braking block is 2.8 mm.

4. The shopping cart foot wheel capable of warning the abrasion status of the braking block of claim 1, wherein the outer diameter of the escalator wheel core is slightly greater than that of the escalator wheel disc.

5. The shopping cart foot wheel capable of warning the abrasion status of the braking block of claim 1, wherein the escalator wheel disc is made from polyurethane (PU) and polypropylene (PP) materials, and is formed via one-step injection molding method.

6. The shopping cart foot wheel capable of warning the abrasion status of the braking block of claim 1, wherein the braking block is made from PU material, and is formed via one-step injection molding method.

7. The shopping cart foot wheel capable of warning the abrasion status of the braking block of claim 1, wherein the pre-buried wire is made from copper.

8. The shopping cart foot wheel capable of warning the abrasion status of the braking block of claim 1, wherein the indicator light comprises but not limited to a red LED light and a yellow LED light.

9. The shopping cart foot wheel capable of warning the abrasion status of the braking block of claim 1, wherein the escalator wheel support is further provided with a PP anti-collision ring, a polyvinyl chloride (PVC1 dustproof ring and a metal gasket, wherein the PP anti-collision ring is externally connected with the top side wall of the escalator wheel support, and the PVC dustproof ring is arranged on the top wall of the escalator wheel support, wherein the metal gasket is embedded in the top of the escalator wheel support.

10. The shopping cart foot wheel capable of warning the abrasion status of the braking block of claim 2, wherein a heat shrinkable sleeve is sleeved on the exterior of the broken circuit flash light assembly, and the broken circuit flash light assembly is attached to the outer surface of the escalator wheel core through a hot-melt adhesive.

11. The shopping cart foot wheel capable of warning the abrasion status of the braking block of claim 3, wherein a heat shrinkable sleeve is sleeved on the exterior of the broken circuit flash light assembly, and the broken circuit flash light assembly is attached to the outer surface of the escalator wheel core through a hot-melt adhesive.

12. The shopping cart foot wheel capable of warning the abrasion status of the braking block of claim 2, wherein the outer diameter of the escalator wheel core is slightly greater than that of the escalator wheel disc.

13. The shopping cart foot wheel capable of warning the abrasion status of the braking block of claim 3, wherein the outer diameter of the escalator wheel core is slightly greater than that of the escalator wheel disc.

14. The shopping cart foot wheel capable of warning the abrasion status of the braking block of claim 2, wherein the escalator wheel disc is made from PU and PP materials, and is formed via one-step injection molding method.

15. The shopping cart foot wheel capable of warning the abrasion status of the braking block of claim 3, wherein the escalator wheel disc is made from PU and PP materials, and is formed via one-step injection molding method.

16. The shopping cart foot wheel capable of warning the abrasion status of the braking block of claim 2, wherein the braking block is made from PU material, and is formed via one-step injection molding method.

17. The shopping cart foot wheel capable of warning the abrasion status of the braking block of claim 3, wherein the braking block is made from PU material, and is formed via one-step injection molding method.

18. The shopping cart foot wheel capable of warning the abrasion status of the braking block of claim 2, wherein the pre-buried wire is made from copper.

19. The shopping cart foot wheel capable of warning the abrasion status of the braking block of claim 3, wherein the pre-buried wire is made from copper.

20. The shopping cart foot wheel capable of warning the abrasion status of the braking block of claim 2, wherein the indicator light comprises but not limited to a red LED light and a yellow LED light.

21. The shopping cart foot wheel capable of warning the abrasion status of the braking block of claim 3, wherein the indicator light comprises but not limited to a red LED light and a yellow LED light.

* * * * *